(12) United States Patent
Suermondt et al.

(10) Patent No.: US 7,908,254 B2
(45) Date of Patent: Mar. 15, 2011

(54) IDENTIFYING CHARACTERISTICS IN SETS OF ORGANIZED ITEMS

(75) Inventors: Henri Jacques Suermondt, Sunnyvale, CA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 927 days.

(21) Appl. No.: 11/149,509

(22) Filed: Jun. 10, 2005

(65) Prior Publication Data
US 2006/0282475 A1 Dec. 14, 2006

(51) Int. Cl.
*G06F 7/00* (2006.01)
*G06F 17/30* (2006.01)
(52) U.S. Cl. .................. 707/698; 707/747; 707/773
(58) Field of Classification Search .................. None
See application file for complete search history.

(56) References Cited

U.S. PATENT DOCUMENTS

| | | | | |
|---|---|---|---|---|
| 5,202,982 A * | 4/1993 | Gramlich et al. | ............... | 707/2 |
| 5,205,982 A * | 4/1993 | Fukase et al. | ............... | 164/450.4 |
| 5,341,466 A * | 8/1994 | Perlin et al. | ............... | 345/668 |
| 5,781,629 A * | 7/1998 | Haber et al. | ............... | 713/177 |
| 6,061,743 A * | 5/2000 | Thatcher et al. | ............... | 719/328 |
| 6,202,066 B1 * | 3/2001 | Barkley et al. | ............... | 707/785 |
| 6,216,140 B1 * | 4/2001 | Kramer | ............... | 715/511 |
| 6,236,993 B1 * | 5/2001 | Fanberg | ............... | 707/690 |
| 6,433,798 B1 * | 8/2002 | Smith et al. | ............... | 715/764 |
| 6,449,604 B1 * | 9/2002 | Hansen et al. | ............... | 1/1 |
| 6,618,792 B1 * | 9/2003 | Perrin et al. | ............... | 711/122 |
| 7,098,957 B2 * | 8/2006 | Kim et al. | ............... | 348/452 |
| 7,383,504 B1 * | 6/2008 | Divakaran et al. | ............... | 715/723 |
| 2002/0048369 A1 * | 4/2002 | Ginter et al. | ............... | 380/277 |
| 2003/0037056 A1 * | 2/2003 | Sedlar | ............... | 707/100 |
| 2005/0131961 A1 * | 6/2005 | Margolus et al. | ............... | 707/200 |

OTHER PUBLICATIONS

Martel Chip et al., "A General Model for Authenticated Data Structures," Dec. 6, 2001, UC Davis Department of Computer Sciences, pp. 1-41.*

* cited by examiner

*Primary Examiner* — Charles Rones
*Assistant Examiner* — Daniel Kuddus

(57) ABSTRACT

A system and method is provided for determining characteristics of sets of organized items.

In an illustrative implementation, a first set of organized items as a compare-from location is identified, and a second set of organized items as a compare-to location is also identified. In an illustrative operation, a recursive intrinsic reference representing the first set of organized items is determined so that the recursive intrinsic reference is an intrinsic reference to an item containing a second intrinsic reference. A discrepancy is determined between the first set of organized items and the second set of organized items using the recursive intrinsic reference.

32 Claims, 9 Drawing Sheets

IDENTIFYING CHARACTERISTICS IN SETS OF ORGANIZED ITEMS

BACKGROUND

The management of electronic data can be a significant undertaking for individuals and organizations alike. With the proliferation of various digital data formats and applications (e.g., music files, image files, business application files, e-mail, etc.) as well as the availability of inexpensive electronic data storage media, computing environment users are afforded the luxury of storing volumes of electronic data. Computer users are often left with the arduous task of classifying, organizing, and labeling their electronic files using their computing environment's file system. This task can be time intensive and can often require the computer user to perform numerous searches in their file system to identify the location of a particular file or file type. Once identified, the computer user can then often be left to perform a manual association of the various files and/or file types and to manually keep track of the location (e.g., directory structure) of these files and/or file types.

Moreover, given the proliferation of storage media, computer users are afforded the ability to store one or more copies of their personal data (e.g., music files, image files, application files, etc.) for use in various locations. For example, a user can store music files for use on their home computer and on their work computer. It is often the case, however, that a user will update one computer (e.g., storage media of a computing environment) with new files or change the file structure (e.g., organize files in different or new folders) and forget to do the same on another computer on which the user has a copy of such files or file structure. In this context, the user is left to manually or, in some computing environments, with the assistance of synchronization tools try to locate files and their copies. Such synchronization tools can be independent applications or, in some instances, integrated within the operating system of a particular computing environment (e.g., file system management application).

Current approaches are lacking as they generally require significant expenditure of manual resources. In the context of synchronization tools, current solutions operate to compare files between a "from" location and a "to" location. The compare operation can detect whether entire items from the compare-from collection exist in the compare-to location. Additionally, current solutions can operate to detect whether entire directories of items match, provided that the directory structure is the same between the "from" and "to" locations. Moreover current solutions can operate to identify if some directories partially match (i.e., if some subdirectories or files are already backed up between computing environments). However, current solutions generally require that the directory structure between the cooperating environments are organized in the same manner (i.e., the compare-to location is organized in the same was as that in the compare-from location). In reality, users often move files around and often change directory structures rendering existing solutions less useful than desired. Also, current approaches generally only use file names, file sizes, file dates (or folder names, folder dates), and checksums to compare sets of files. A cooperating user is then left to manually inspect the individual files to identify discrepancies. Such practices are lacking as file (and/or folder) names and dates change without changes to the data and manual inspection can be unreliable and tedious.

Since current approaches operate to compare two data items (or directory structures), it is difficult to find and summarize the discrepancies between two sets of organized items, including the discrepancies such as items that are in the "from" location but not in the "to" location and vice versa, and discrepancies in the manner in which items are organized. Without information about what is different between two data items (or directory structures), more manual efforts can be required to ascertain what portions of data (or directory structures) exist in multiple locations (e.g., "from" location and/or "to" location) to ensure completeness of collections and data sets despite varying organization in these locations.

BRIEF DESCRIPTION OF THE DRAWINGS

The common components and structure identification systems and methods are further described with reference to the accompanying drawings in which.

DETAILED DESCRIPTION

Figure 1:
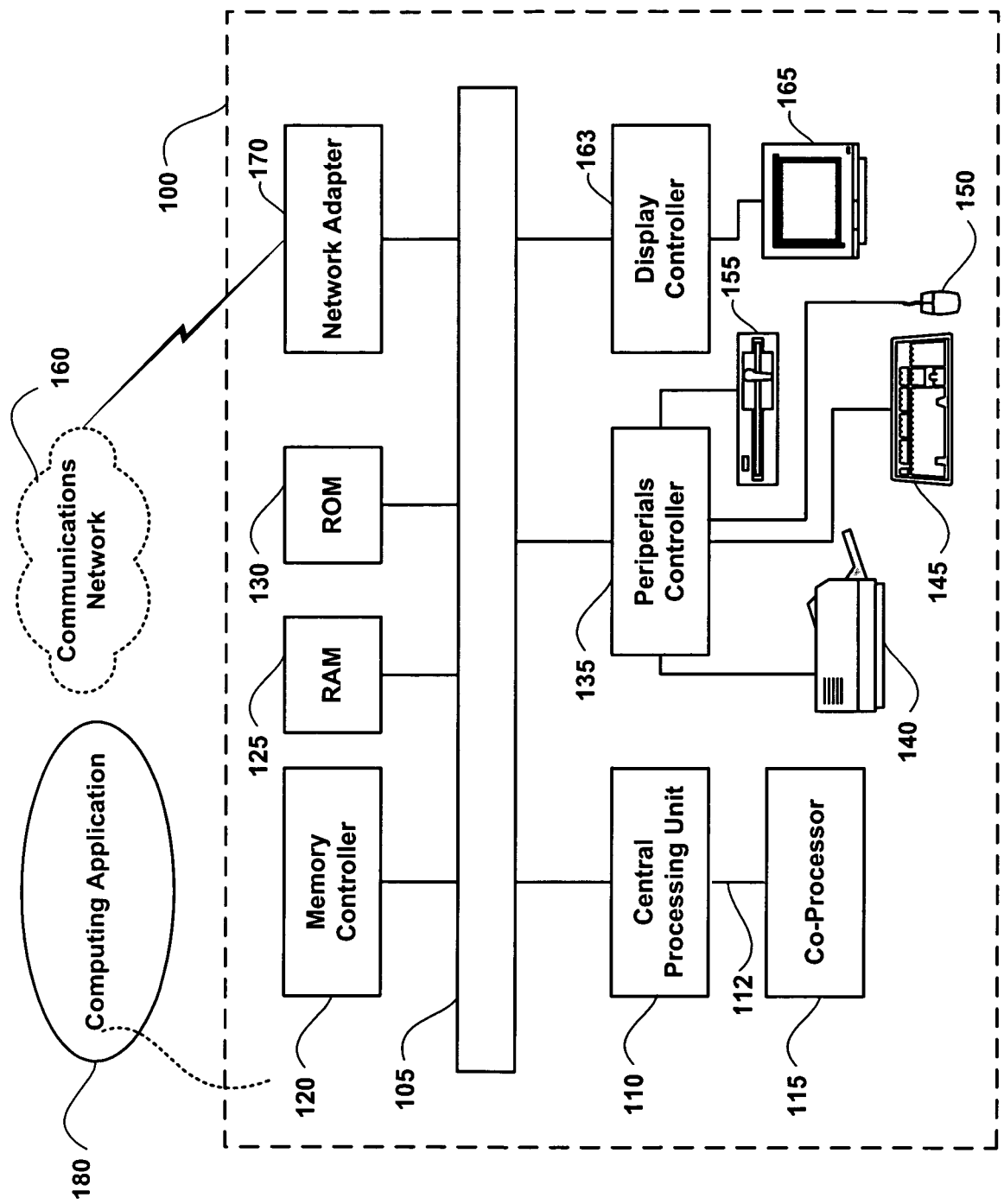
FIG. 1 is a block diagram of one embodiment of an exemplary computing environment in accordance with an implementation of the herein described systems and methods.

FIG. 1 depicts an exemplary computing system 100 in accordance with herein described system and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110 that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

In operation, the CPU 110 fetches, decodes, and executes instructions, and transfers information to and from other resources via the computer's main data-transfer path, system bus 105. Such a system bus connects the components in the computing system 100 and defines the medium for data exchange. Memory devices coupled to the system bus 105 include random access memory (RAM) 125 and read only memory (ROM) 130. Such memories include circuitry that allows information to be stored and retrieved. The ROMs 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed.

In addition, the computing system 100 can contain peripherals controller 135 responsible for communicating instructions from the CPU 110 to peripherals, such as, printer 140, keyboard 145, mouse 150, and data storage drive 155. Display 165, which is controlled by a display controller 163, is used to display visual output generated by the computing system 100. Such visual output may include text, graphics, animated graphics, and video. The display controller 163 includes electronic components required to generate a video signal that is sent to display 165. Further, the computing system 100 can contain network adaptor 170 which may be used to connect the computing system 100 to an external communication network 160.

Figure 2:
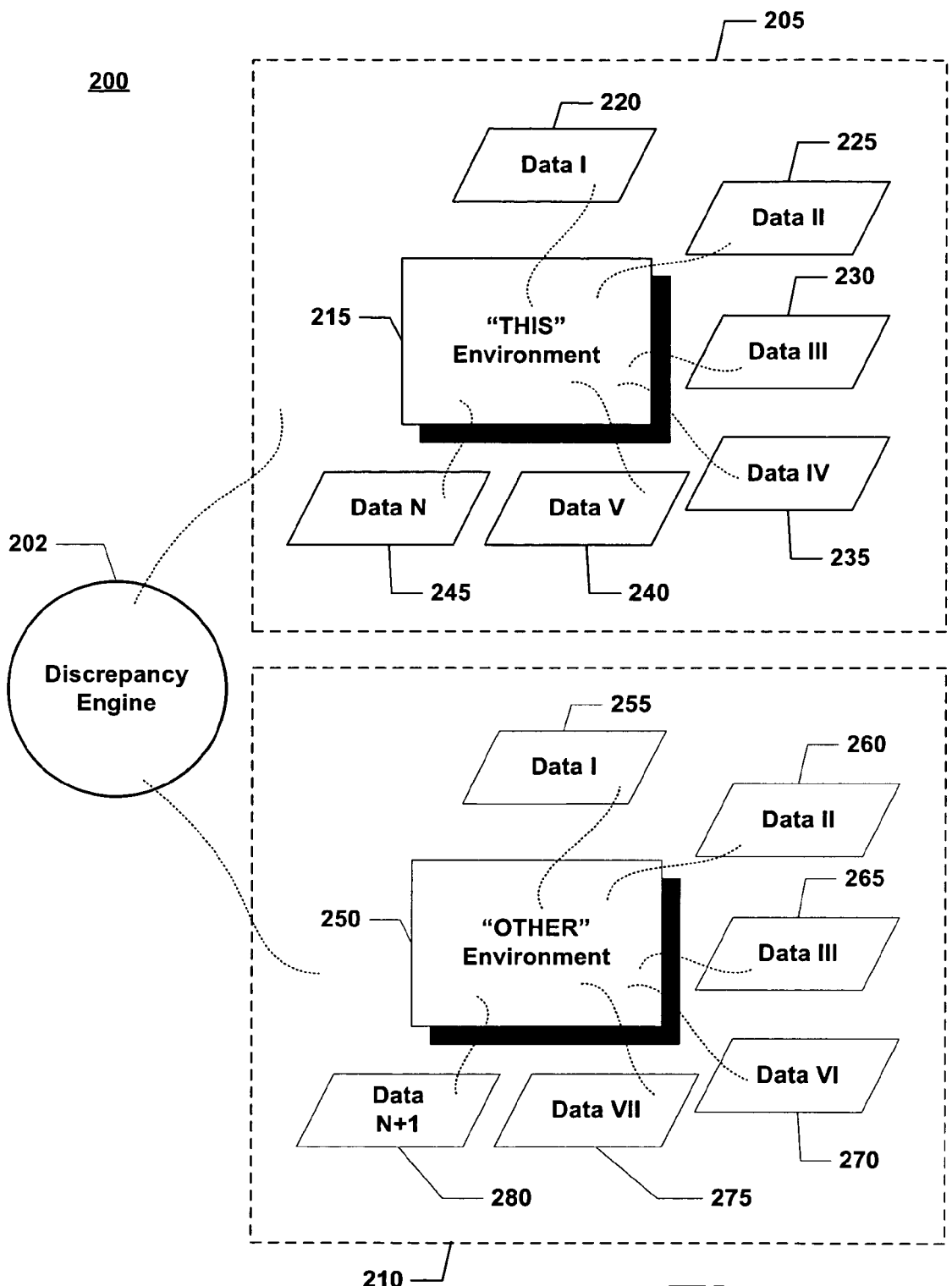
FIG. 2 is a block diagram of one embodiment showing the cooperation of exemplary components of an illustrative implementation in accordance with the herein described systems and methods.

Illustrative Component Identification Environment:

FIG. 2 shows an illustrative implementation of exemplary data environment 200. As is shown exemplary data environment 200 comprises computing environment 205, computing environment 210, and discrepancy engine 202. Discrepancy engine 202 can, in an illustrative operation, identify discrepancies and common characteristics between sets of organized items. As used herein, a characteristic can include but is not limited to an attribute, including structure. As used herein, examples of organized items include data, computer files, documents, portions or chunks of computer files, images, names, text strings, and entries representing people in an organization. As used herein, organized items can include but is are not limited to items that are arranged in a particular manner. In an illustrative implementation, the exemplary items can be arranged as exemplified by folders in a computer file system. In another illustrative implementation, the exemplary items can be arranged as exemplified by topic hierarchies in a document classification system. In another illustrative implementation, the exemplary items can be arranged as exemplified by organizational reporting structure in a corporate environment. As used herein, discrepancies can include but are not limited to items that are in one set of organized items but not in another set, items that share some attributes but differ in other attributes with a corresponding item in a different location, and differences in organization among items.

Figure 6:
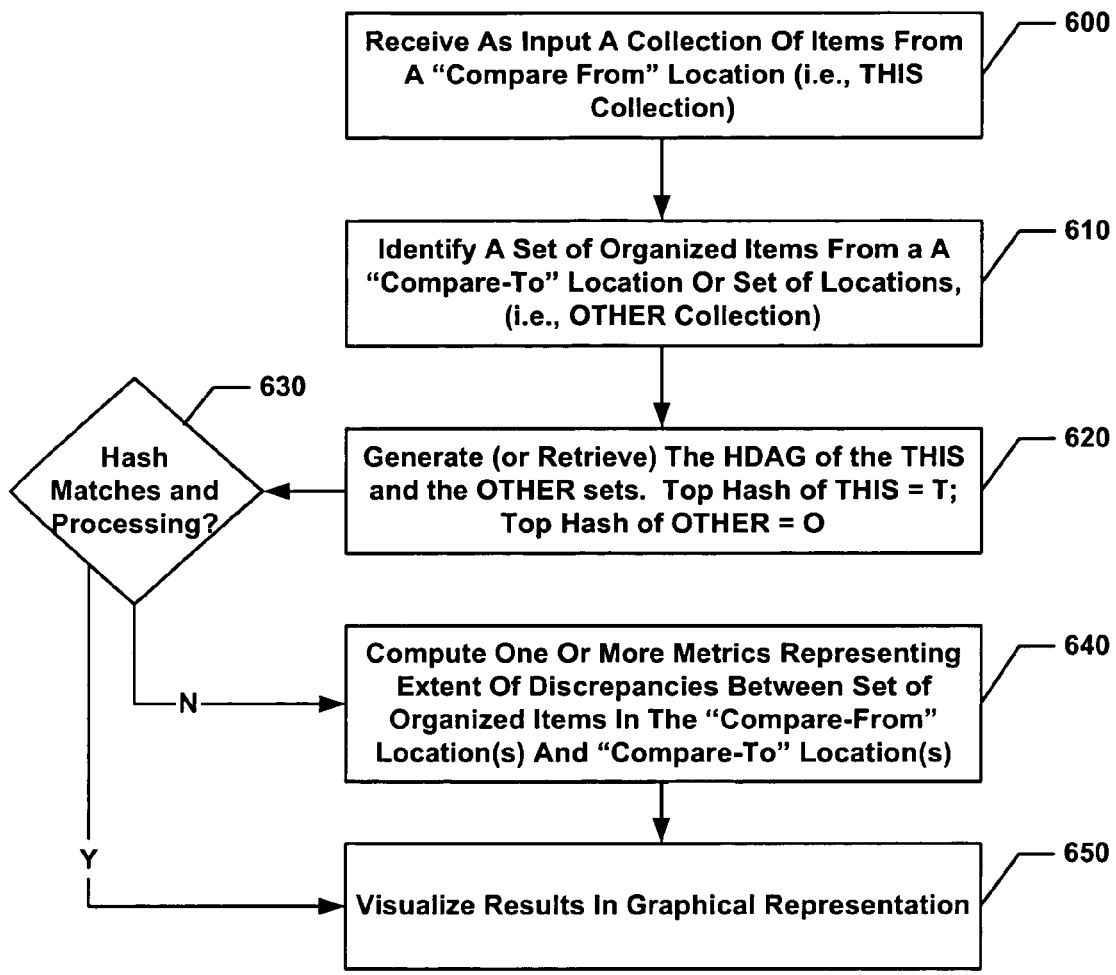
FIG. 6 is a flow diagram of one embodiment of the processing performed in an illustrative operation in accordance with the herein described systems and methods.
Figure 7:
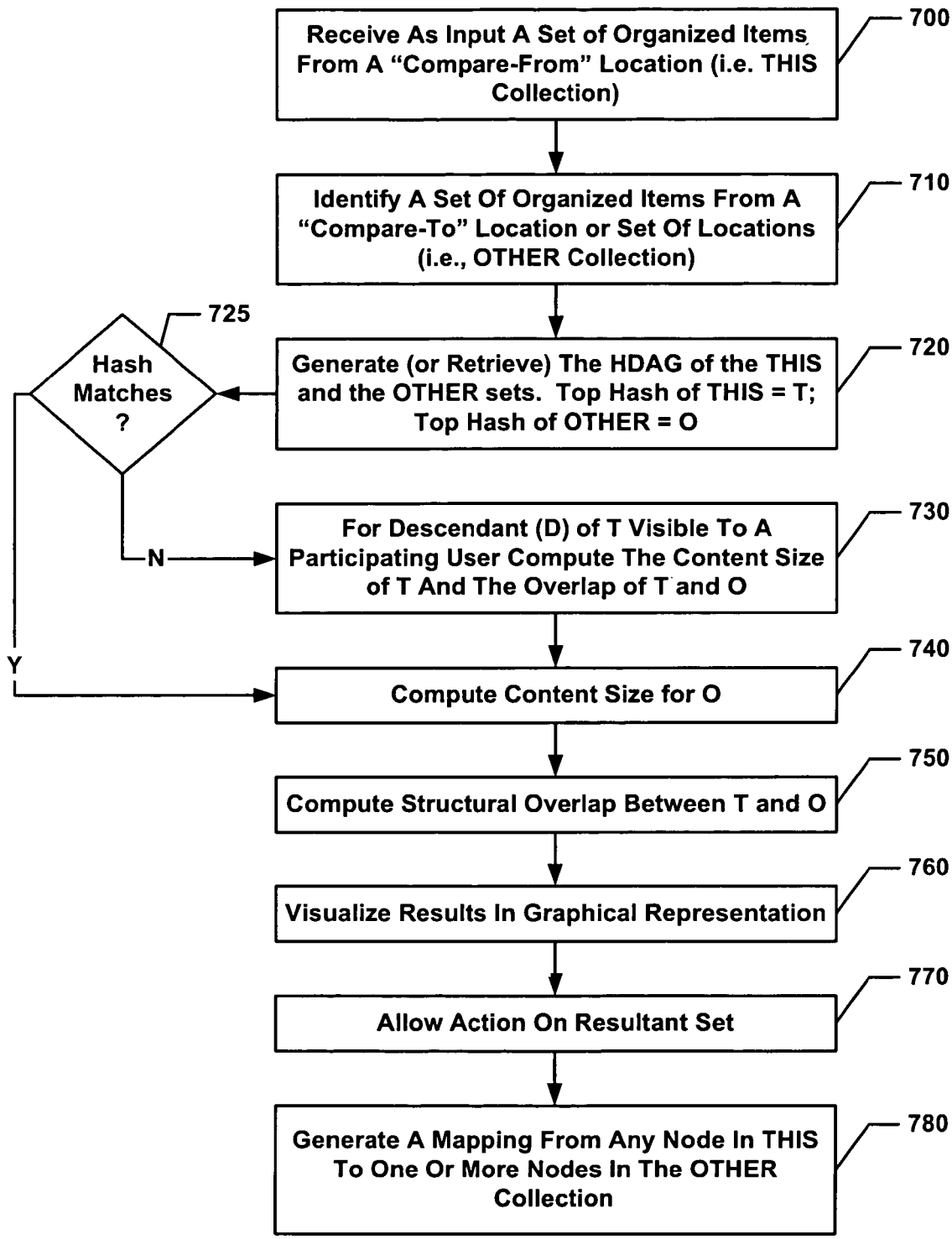
FIG. 7 is a flow diagram of one embodiment of the processing performed in another illustrative operation in accordance with the herein described systems and methods.

Further, as is shown exemplary computing environment 205 comprises THIS computing environment 215 (e.g., a computing environment acting as the first reference point—"compare-from"—for a comparison of sets of organized items) which cooperates with a plurality of sets of organized items (such as data or data directory structures) Data I 220, Data II 225, Data III 230, Data IV 235, Data V 240, and Data N 245. Similarly, computing environment 210 comprises OTHER computing environment 250 (e.g., a computing environment acting as the second reference point—"compare-to"—for a comparison of data and data directory structures) which cooperates with a plurality of data (or data directory structures) Data I 255, Data II 260, Data III 265, Data VI 270, Data VII 275, and Data N+1 280. Additionally, discrepancy engine 202 can comprise at least one rule (as shown in FIG. 6 and FIG. 7) which instructs discrepancy engine 202 to compare sets of organized items to identify discrepancies between the sets.

In an illustrative operation, discrepancy engine 202 can cooperate with computing environment 205 and computing environment 210 to identify data and data directories that are common to both THIS computing environment 215 and OTHER computing environment 250 as well as identify the discrepancies in data or data directories found on THIS computing environment 215 and OTHER computing environment 250. In the illustrative operation, discrepancy engine 202 can cooperate with THIS computing environment 215 to receive as input a collection of items from which to compare with a collection of items found on OTHER computing environment 250. Discrepancy engine 202 can operate to apply one or more rules (e.g., chunking algorithms, generation of recursive intrinsic reference representations such as hash directed acyclic graphs (HDAGs), algorithms to process pairs of HDAGs and, algorithms to detect differences in data sets) to the sets of organized items (data or data directory structures) (e.g., DATA I 220, DATA II 225, DATA III 230, DATA IV 235, DATA V 240, and/or DATA N 245) on THIS computing environment 215 and to the data (or data directory structures) (e.g., DATA I 255, DATA II 260, DATA III 265, DATA VI 270, DATA VII 275, and DATA N+1 280) to identify discrepancies in the data and/or the organization of the data, such as data directory structures.

Moreover, in the illustrative operation, discrepancy engine 202 can be operable to compute a metric representing the discrepancies. In an illustrative implementation, exemplary metrics can include but are not limited to indications of whether items are missing in one set of items that are present in the other, using the number of items that are organized differently, and using the degree of difference of organization between the sets of organized items. Also, such computation can include using an attribute of organized items that show discrepancies (e.g., file size).

In the illustrative operation, discrepancy engine 202 can operate to provide a graphical display (not shown) of the results from a comparison of data (or data directory structures) between THIS computing environment 215 and OTHER computing environment 250. In an illustrative implementation, discrepancy engine 202 can be implemented as a computing application operating on one or more of cooperating computing environments (e.g., computing environment 205 and computing environment 210).

It is appreciated that although exemplary data environment 200 is shown to have various components cooperating in various configurations that such description is merely illustrative as the inventive concepts described herein can be applied to various data environments having various components cooperating in various configurations.

Figure 3:
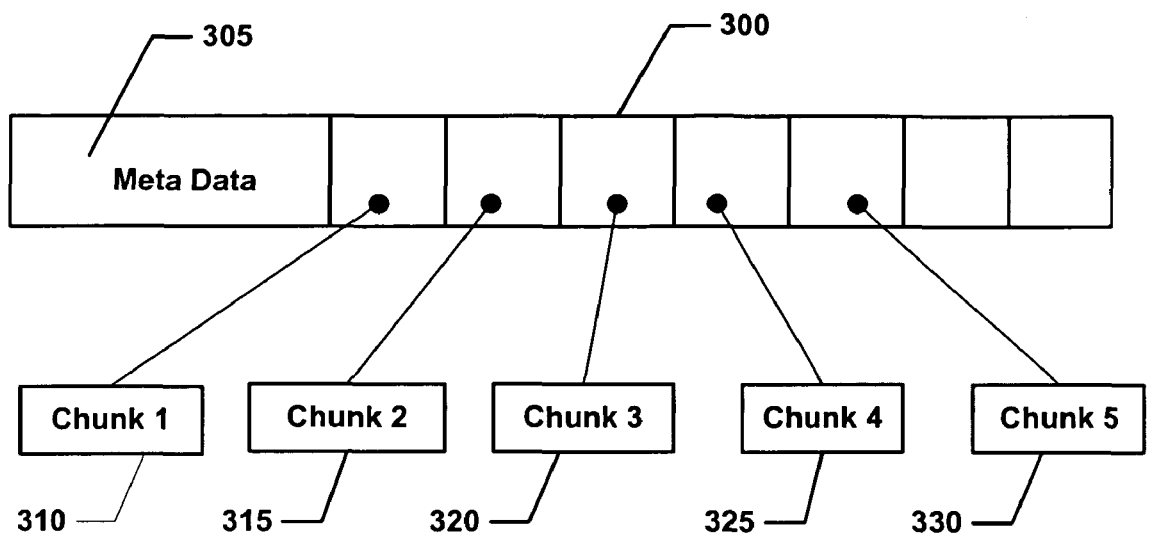
FIG. 3 is a block diagram of one embodiment showing an illustrative block representation of an illustrative file in accordance with the herein described systems and methods.

Identifying Characteristics:

FIG. 3 shows a block representation of an illustrative implementation of exemplary data file 300 for use by the herein described systems and methods. As is shown, exemplary data file 300 can be represented by meta data portion 305 and one or more data file chunks such as "Chunk 1" 310, "Chunk 2" 320, "Chunk 3" 320, "Chunk 4" 325, and "Chunk 5" 330. Meta data 305 and chunks 310, 315, 320, 325, and 330 can be used by discrepancy engine 202 of FIG. 2 when comparing sets of organized items (such as data or data directory structures) between various computing environments (e.g., computing environment 205 and 210 of FIG. 2). In an illustrative implementation, a chunk can comprise a sequence of bytes representing data. In the illustrative implementation data file 300 can be a representation of a chunk based hash based directed acyclic graph (HDAG) representation of a file.

In this context, meta data portion 305 can consist of the name and creation date of the file. Moreover, the children of the HDAG representation of a file can represent the file's data content. In this context, HDAG nodes can be based on the content of the data file (e.g., content of the object) and can also be based on the object's links to other objects (e.g., links between content of disparate data files). When deployed, two HDAG nodes are different if the two sets of items represented by the two HDAG nodes do not match in either content or organization. In an illustrative implementation, if one or more bit is different between corresponding chunks in the sets of items being compared as represented by two HDAG nodes, then the HDAG nodes do not match. Also, in the illustrative implementation, if the same items in the sets being compared are organized differently (e.g., if the same set of chunks are arranged differently between the two sets of items), then the HDAG nodes corresponding to the sets being compared do not match. In an illustrative operation, a selected hash function (e.g., MD5) can be applied to chunks 310, 315, 320, 325, and 330 to generate a set of hash values that represents the content of the set of chunks.

It is appreciated that various hash functions can be applied to chunks 310, 315, 320, 325, and 330 to generate a set of hash values that represents the content of the set of chunks. It is further appreciated that a hash function can be considered a procedure for mapping items from a domain D to a range R such that two different items from D are mapped to two different items in R with high probability. Exemplary hash functions include, but are not limited to, MD5, SHA1, Rabin's Fingerprint and any of the family of Universal Hashes.

The set of hash values (which are examples of intrinsic references) is stored in an HDAG node, together with a representation of the meta data portion 305. The content of the file can be represented either as one large chunk, or as a sequence of chunks (e.g., 310, 315, 320, 325, and 330). In an illustrative implementation, the same hash function can be applied to the entire HDAG node (comprising meta data portion and chunks) to get a hash value representing the meta data, organization, as well as the content. This second hash value is a recursive intrinsic reference, in that it is an intrinsic reference to an item containing a second intrinsic reference.

In an illustrative implementation, the sequence of chunks can have boundaries that are determined by a stateless chunking algorithm (not shown), or some other mapping from byte sequences to HDAGs which can create the chunks. A stateless chunking algorithm (e.g., basic sliding window algorithm, two divisors algorithm, and two thresholds-two divisors algorithms) can operate to create a sequence of blocks or chunks (c1, c2, c3, . . . etc.) that represents a long byte sequence S. Moreover, the stateless chunking algorithm can operate so that any local modification to S (i.e., to generate S') does not impact most of the chunks that represent S (i.e., if the chunking algorithm is applied to S', most of the chunks created for S' are identical to the chunks created for S). In using a stateless chunking algorithm to create chunks, a comparison of files to identify portions that are different can be realized.

Figure 4:
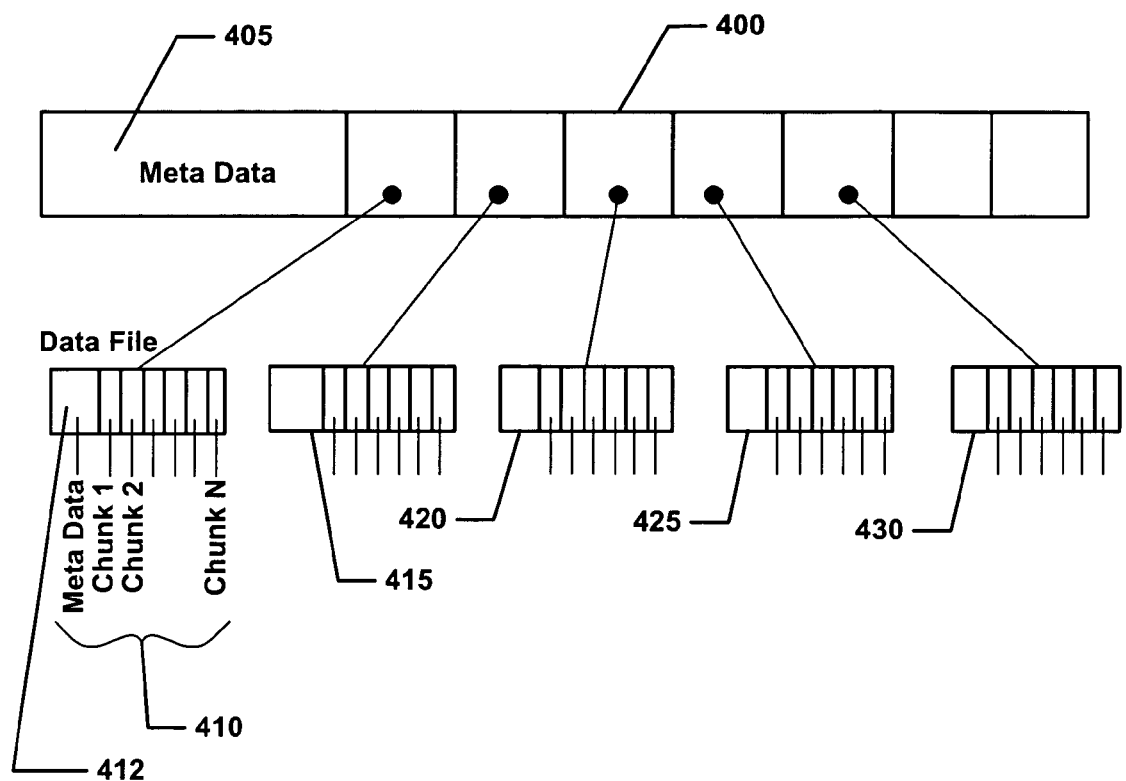
FIG. 4 is a block diagram of one embodiment showing an illustrative block representation of an illustrative directory structure in accordance with the herein described systems and methods.

FIG. 4 shows a block representation of an illustrative implementation of exemplary directory structure 400. As is shown, exemplary directory structure 400 comprises meta data portion 405 and data parts 410, 415, 420, 425, and 430. In an illustrative implementation exemplary data structure 400 can be an HDAG representation of a directory. In this context, exemplary data structure 400 can comprise meta data portion 405 which provides information about the directory structure, and has references to the descendant of the directory structure, the data parts 410, 415, 420, 425, and 430. The data parts 410, 415, 420, 425, and 430 can comprise HDAG representations of the contents of the directory (e.g., as is shown by exemplary file 300 of FIG. 3). In an illustrative implementation, data part 410 can comprise meta-data portion 412 and various data chunks (e.g., Chunk 1, Chunk 2, up to and including Chunk N). In the HDAG context, the representation of items and collections as HDAG can be generated according to a selected rule (or set of rules) for mapping items and sets of items to HDAG nodes. Additionally, the illustrative implementation can accommodate one or more methodologies for representing items and sets of items and HDAG nodes. In an illustrative operation a consistent methodology for generating HDAG nodes is employed to ensure efficient operation of a comparison function.

In an illustrative implementation, the chunk-based HDAG file and or directory can include an intrinsic reference (e.g., a reference that is based on the content of the object—file and/or directory) and recursive intrinsic references (e.g., a reference to an item that contains another intrinsic reference or, possibly, to another recursive intrinsic reference). In an illustrative operation, the recursive intrinsic reference can be utilized to determine discrepancies between a first exemplary set of organized items and second set of organized items.

It is appreciated that although illustrative implementations of exemplary file 300 and exemplary directory structure 400 are shown, such description is merely illustrative as the inventive concepts described herein can apply to various representations of files and directory structures.

Figure 5A:
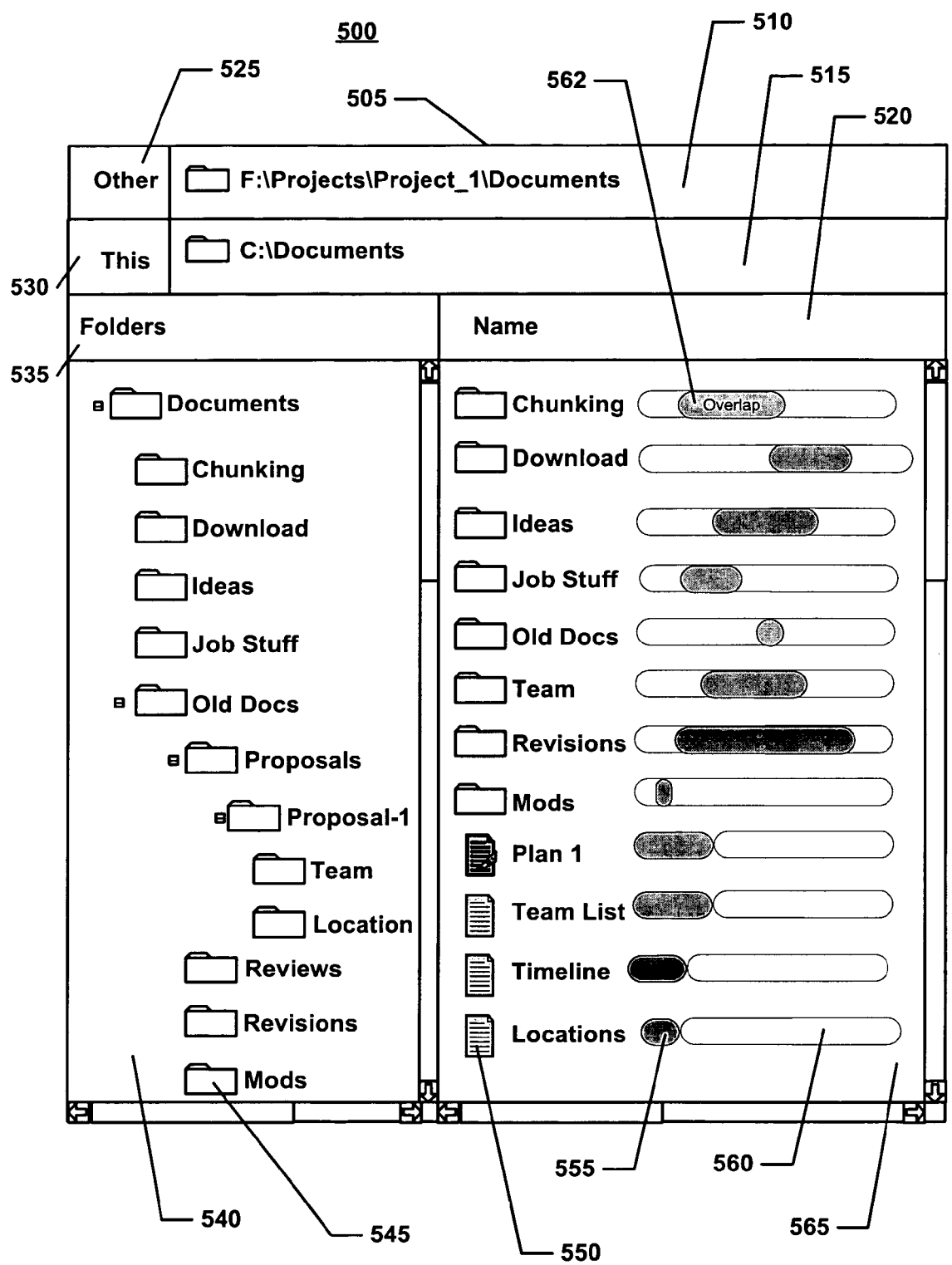
FIG. 5A is a block diagram of one embodiment of an illustrative user interface in accordance with the herein described systems and methods.

FIG. 5A shows an illustrative implementation of exemplary data comparison graphical user interface (GUI) 500 to display visualizations of discrepancy identification options. As is shown in FIG. 5A, data comparison GUI 500 comprises display pane 505 having data directory display pane 540 and result display pane 565, display pane designation areas 520 and 535, path designation areas 510 and 515, computing environment designation areas 525 and 530, data designators 545 and 550, and results 555 and 560.

In an illustrative operation, display pane 500 can be used to display the results of comparison operation performed on two cooperating computing environments designated as "This" and "Other" as described by computing environment designation areas 525 and 530, respectively. Further as is shown, the paths (e.g., location of data in a given file system) being compared in each of the two cooperating computing environments can be designated in path designation areas 510 for the "Other" computing environment (e.g., computing environment 250 of FIG. 2) and 515 for the "This" computing environment (e.g., computing environment 215 of FIG. 2). In the illustrative operation, display pane designation area 535 can be used to designate "Folders" that are present in either of the "This" or "Other" cooperating computing environments. Additionally, display pane designation area 520 can be used to designate "Name" of data files and/or data folders that are relevant to an item of interest in display pane 540, for example data files and/or data folders within the folder of interest that are common (in whole or in part) to the cooperating computing environments (e.g., "This" and "Other" cooperating computing environments).

It is appreciated that although exemplary display pane 500 is shown and described to have one or more designation areas having specific designations (e.g., Folders and Name), such description is merely illustrative as the inventive concepts described herein can provide for various designation areas having a plurality of designations other than those described.

Within display pane 540, a list of folders 545 (or files—not shown) available on "This" computing environment can be displayed, while display pane 565 can be used in the illustrative operation to display folders/files 550 that are relevant to an item of interest in display pane 540, for example items within a folder of interest (e.g., "Documents") partially common to both the "This" and "Other" cooperating computing environments. Also, display pane 565 can be used in the illustrative operation to display a graphical representation 555 and 560 of the similarity and discrepancies of data and/or data directory structures of the common files and folders. In the illustrative operation, display pane 565 can be used to show both the overlap and/or difference in content and/or organization of content between two data locations. Stated differently, if a first exemplary data directory contains all of the same files as another data directory (to which the first exemplary data directory is being compared), but the names of the data files in the data directory have all changed in the other data directory, display pane 565 can be used to provide a visualization of such scenario. Additionally, display pane 565 can be used to provide a visualization that indicates the change in organization in two compared data directories but having the same data files. In an illustrative implementation, if folder "Job Stuff" in the "This" computing environment contains the same data files as corresponding folder "Job Stuff" in the "Other" computing environment, but these files have been organized under different sub-folders in the "Other" computing environment, the display pane 565 can be used to provide a visualization of such scenario.

It is appreciated that although exemplary display pane 565 is described to operate to display one or more visualizations that can describe the results of comparing two sets of organized items (e.g., data files and/or data directory structure) that such description is merely illustrative as the inventive concepts described herein can be applied to create numerous visualizations, other than those described, to handle such comparison.

The graphical representation 555 and 560 can be various graphical representations. In an illustrative implementation, graphical representations 555 and 560 can be ovals of varying size to indicate the size of data (or data directory structures). Additionally, the placement of graphical representations 555 and 560 (e.g., overlapping ovals 562 to indicate the degree of structural overlap between two data sets) can indicate the amount of similarity between two data sets (e.g., common files (in whole or in part) found in two identically named folders residing on two different cooperating computing environments).

In an illustrative implementation, two sets of organized items (e.g., data sets on cooperating computing environments) can be represented by ovals (e.g., 555 and 560) whose size can be proportional to the size of the collection, and the overlap between the collections can be represented as an area of intersection of the two ovals. Another illustrative implementation is to omit the representation of the parts of one of the data sets that are not common to both cooperating computing environments. In this context, one oval can be provided whose size proportional to the size of the item (e.g., file or part of file) that is under consideration and the size of the overlap can be depicted as a shaded area in the single oval. In an illustrative implementation, the size of the oval can be based on a metric representing the discrepancies between the sets of organized items. This metric can be computable by discrepancy engine 202 of FIG. 2.

Figure 5B:
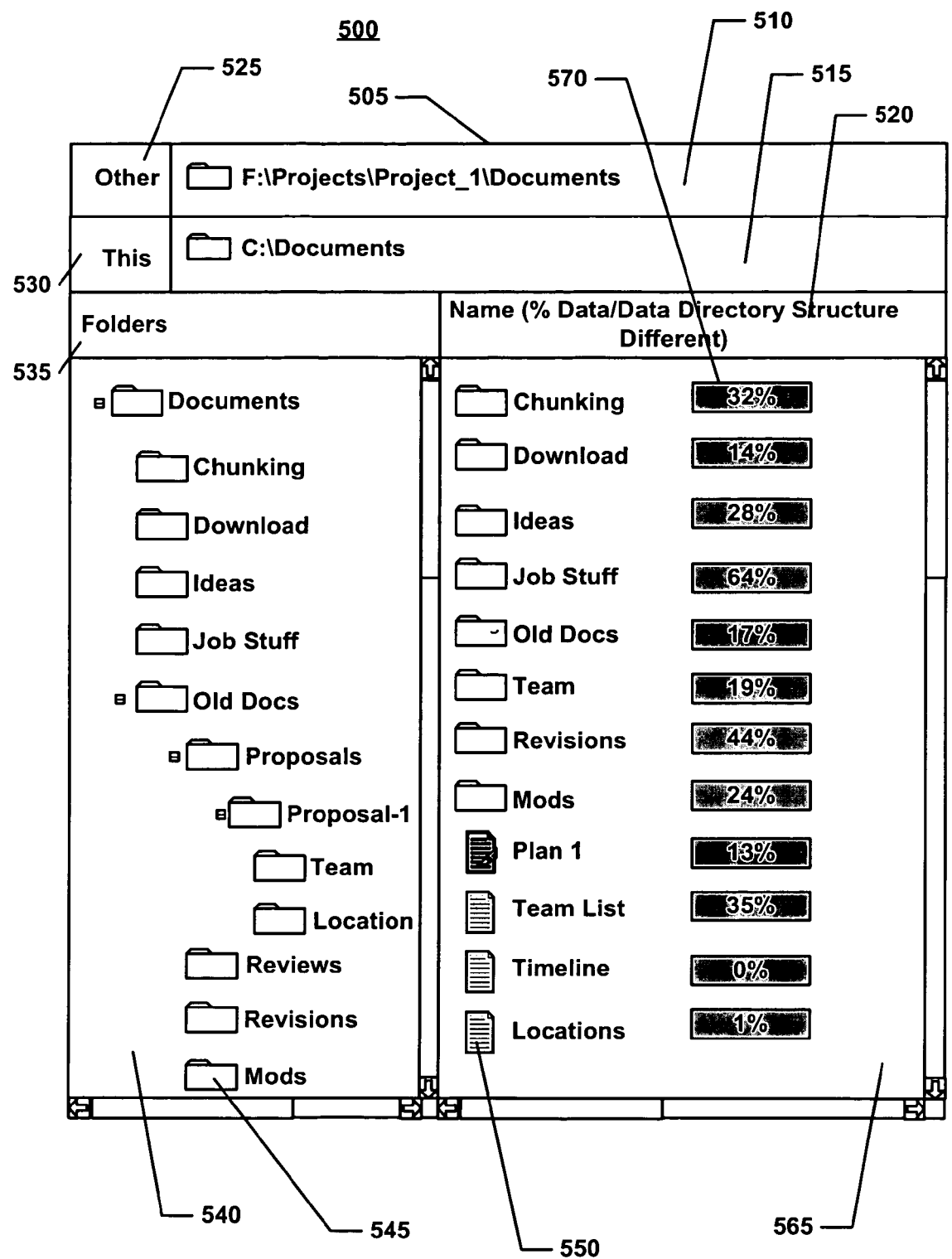
FIG. 5B is a block diagram of one embodiment of another illustrative user interface in accordance with the herein described systems and methods.

Another illustrative implementation can be to represent the discrepancy of data (or data directory structures) as a percentage number (e.g., 32% of the contents are not found in a first cooperating computing environment are found in a second cooperating computing environment) as is shown in FIG. 5B. As is shown in FIG. 5B, exemplary display pane 500 can comprise the same elements as found in FIG. 5A. In an illustrative operation, as is show in FIG. 5B, exemplary display pane 500 can operate to represent the amount of data and/or data directory structure as discrepancy percentage block 570 that is not present in a first computing environment as compared to the data and/or data/directory structure of a second computing environment.

Figure 5C:
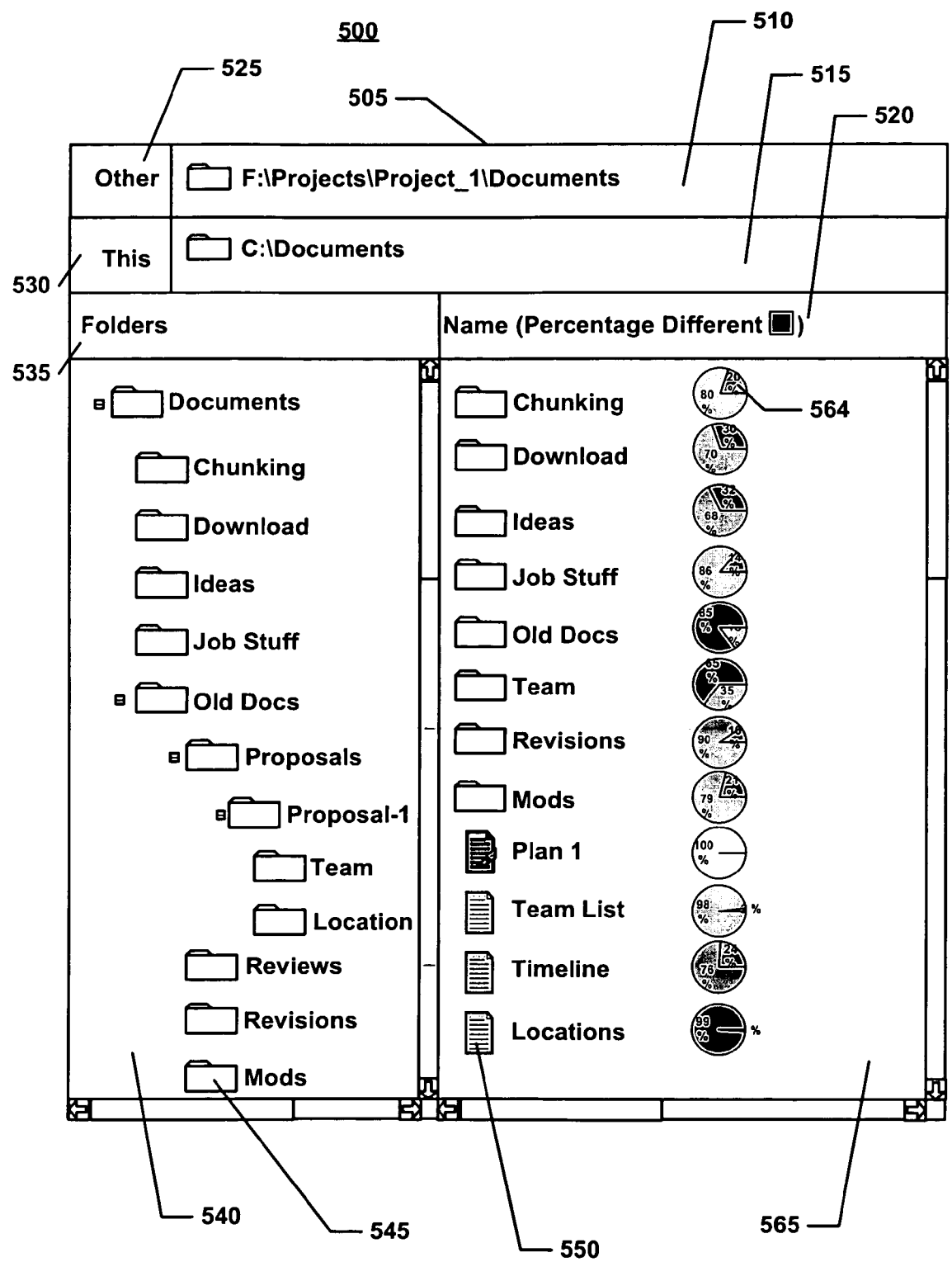
FIG. 5C is a block diagram of one embodiment of another illustrative user interface in accordance with the herein described systems and methods.

Another illustrative implementation can be to represent the percentage in the form of a pie chart as shown in FIG. 5C. As is shown in FIG. 5C, exemplary display pane 500 can comprise the same elements as found in FIG. 5A. In an illustrative operation, as is shown in FIG. 5C, exemplary display pane 500 can operate to represent discrepancy percentage blocks 570 of FIG. 5A as pie charts 564. The portions of pie charts 564 that describe overlapping portions between data sets, in the illustrative implementation, can be based on the metric computed by discrepancy engine 202 of FIG. 2.

It is appreciated that although data comparison GUI 500 is shown to have various components having various operations that such description is merely illustrative as the inventive concepts described herein can apply to various GUIs having various components having various operations different from that described herein. It is also appreciated that the graphical representation of the computed overlap and discrepancies can be rendered as a text-based output, such as output to a UNIX pipe for standard output (stdout) or standard error (stderr).

FIG. 6 shows an illustrative processing performed when identifying discrepancies between sets of organize items (e.g., organized data files and/or organized data file directories). As is shown, processing begins at step 600 where a set of organized items from a "compare-from" location (e.g., THIS computing environment 215 of FIG. 2) are received for processing. From there processing proceeds to step 610 where a set of organized items from a "compare-to" location or set of locations (e.g., OTHER computing environment 250 of FIG. 2) is identified. The HDAG of the "compare-from" and "compare-to" set of organized items are then generated or retrieved at step 620. Additionally, the label T is initially assigned to the top hash for the "compare-from" location and the label O is assigned to the top hash for the "compare-to" location.

In an illustrative implementation, step 620 can operate to determine a recursive intrinsic reference representing the organized items in the "compare-from" location such that the recursive intrinsic inference is an intrinsic inference to an item containing a second intrinsic inference. In the illustrative implementation, the recursive intrinsic reference can be the result of a hash function such as MD5 applied to an HDAG node. Furthermore, in the illustrative implementation, the discrepancies between the "compare-from" and "compare-to" items are identified using the recursive intrinsic inference. Specifically, the identification of a recursive intrinsic reference (e.g., a reference to an intrinsic reference or another recursive intrinsic reference) can be indicative that a data file directory contains a particular structure, or a data file contains particular content.

A check is then performed at step 630 to determine if the hash performed at one of the nodes (e.g., nodes of an HDAG representative of the data file and/or data file directory) matches. In an illustrative operation the check at step 630 can comprise a number of steps that include the following. The check at step 630 can start with T, comparing whether T is identical to O. In this context, such comparison can be considered a comparison of two recursive intrinsic references such as hash values. If T and O do not match, the HDAG node corresponding to O is retrieved using the reference O. This HDAG node contains one or more additional intrinsic references to additional HDAG nodes representing different sets (for example, subsets) of organized items in the "compare-to" location. T can then be compared with each of the newly identified intrinsic references. This process can then be repeated until a match is found between T and one of the recursive intrinsic references representing the "compare-to" location. If such match is found, step 630 returns Y and processing proceeds to step 650 where the results of the comparison are visualized as a graphical representation.

If no match is found between T and any of the recursive intrinsic references representing the "compare-to" location, reference T is used to determine a second recursive intrinsic reference representing an organized subset of the first set of organized items, and the comparison to O and the set of organized items represented by it is repeated. In the illustrative operation, the comparison to O can be repeated for each of the descendants of the HDAG node represented by reference T and repeated until the discrepancies of interest (e.g., in content and organization) for the entire set of organized items in the "compare-from" location are known. After the recursion is completed, processing proceeds to step 640 where one or more metrics representing the extent of discrepancies between the set of organized items in the "compare-from" location and the "compare-to" location is computed.

It is appreciated that the description of step 630 is merely illustrative and that alternative implementations of the match in step 630 can be performed. For example, a match can be realized by collecting a complete set of all recursive intrinsic references representing the items from the "compare-from" location as well as those representing items from the "compare-to" location in a single place, and performing a selected cross check on the "compare-to" items and "compare-from" items to identify a match.

In the alternate implementations, one example of a discrepancy of interest that can be identified is the identification of a file in the "compare-from" location that partially overlaps with a file in the "compare-to" location. This can be identified because such files can share a plurality of chunks but their top-level recursive intrinsic references do not match, possibly indicating that either the chunks are arranged differently or some chunks do not overlap between the two files. Another example is the identification of a sub-directory of the "compare-from" location, the contents of which that could have been scattered in the "compare-to" location. Another example is the identification of files whose meta-data (such as file-names) are different between "compare-from" and "compare-to" locations but the actual data comprising the files are identical.

If the check at step 630 indicates that there is a node match, processing proceeds to step 650 where the results of computations from step 620 are visualized in a graphical representation to show that a set of organized items from the "compare-from" location, represented by the compared node, entirely exists in the "compare-to" location. If there is a node match for T at step 630, it can be concluded that the item represented by T is present in the "compare-to" location in its entirety. It can also be concluded that all descendants of the item represented by T are present in the "compare-to" location in their entirety.

However, if it is determined at step 630 that the top-level hash T does not match O (or any descendants of O), processing proceeds to step 640 where one or more metrics representing the extent of the discrepancies between the set of organized items in the "compare-from" location and that in the "compare-to" location is computed, for example based on the content size of T and the overlap of T and O. It is appreciated that this computation can be repeated for descendants of the item represented by T (e.g., a descendant of T visible to a participating user).

The results of the computations from steps 620 and 640 are then visualized in a graphical representation at step 650.

FIG. 7 shows another illustrative processing performed when identifying discrepancies amongst data sets. As is shown, processing begins at step 700 where a set of organized items from a "compare-from" location (e.g., THIS computing environment 215 of FIG. 2) are received for processing. From there processing proceeds to step 710 where a set of organized items from a "compare-to" location or set of locations (e.g., OTHER computing environment 250 of FIG. 2) is identified. The HDAG of the "compare-from" and "compare-to" collections are generated or retrieved a step 720. Additionally, the label T is assigned to the top hash for the "compare-from" location and the label O is assigned to the top hash for the "compare-to" location.

In an illustrative implementation, step 720 can operate to determine a recursive intrinsic reference representing the organized items in the "compare-from" location such that the recursive intrinsic inference is an intrinsic inference to an item containing a second intrinsic inference. Furthermore, in the illustrative implementation, the discrepancies between the "compare-from" and "compare-to" items are identified using the recursive intrinsic inference. Specifically, the identification of a recursive intrinsic reference (e.g., a reference to an intrinsic reference or another recursive intrinsic reference) can be indicative that a data file directory contains a particular structure, or a data file contains particular content.

From step 720, processing proceeds to step 725 where a check is performed to determine if the hash performed at one of the nodes (e.g., nodes of an HDAG representative of the data file and/or data file directory) matches. If the check at step 725 indicates that there is a node match between T and O or between T and one of the descendants of O, processing proceeds to step 740 where the content size for O is computed. From there, processing proceeds to step 750 where the structural overlap (e.g., structural overlap can be considered as an indication of the degree of similarity of the data directory structure of T to a sub-structure of O) between T and O is computed. The results of the computations from steps 720, 730, 740, and 750 are then visualized in a graphical representation at step 760. An action is then allowed on the resultant set at step 770.

Exemplary actions can comprise automatically selecting files present in the "compare-from" location and not present in the "compare-to" location and storing them in a selected location in the "compare-to" location. Additional exemplary actions can comprise selecting files in the "compare-from" location and not present in the "compare-to" location and presenting those missing files to a participating user to determine whether to store them in the "compare-to" location, or some alternative synchronization process based on the identified discrepancies. The selected location for storing files on the "compare-to" location can be selected based on structural similarity between the "compare-from" and "compare-to" data directory structures. From step 770, processing proceeds to step 780 where a mapping can be generated from a node in the "compare-from" (e.g., THIS computing environment 215 of FIG. 2) to one or more nodes in the "compare-to" (e.g., OTHER computing environment 250 of FIG. 2) collection.

However, if at step 725, the check indicates that there are no node matches, processing proceeds to step 730, where for descendants (D) of T (e.g., top hash of the "compare-from" location) that are visible to a participating user the content size of T and the overlap of T and O (e.g., top hash of "compare-to" location) is computed. Processing then proceeds to step 740 and proceeds there from.

It is appreciated that the inventive concepts described herein can be applied to various organized items and not just merely data files and or data file directories. In an illustrative implementation, a comparison of organized items, utilizing the herein described systems and methods, can be performed to identify discrepancies between two organizational charts (e.g., to visualize which parts of an organizational chart has changed). In this illustrative implementation, the identified discrepancies can be used to show location changes for personnel and/or groups (e.g., focus on personnel locations as opposed to organizational name changes). In another illustrative implementation, a comparison of organized items can be performed, utilizing the herein described systems and methods, can be performed to identify discrepancies between two online consumer catalogs. In this context, the results of the comparison can be used to determine how catalog content has been moved around between the online catalogs.

It is understood that the herein described systems and methods are susceptible to various modifications and alternative constructions. There is no intention to limit the invention to the specific constructions described herein. On the contrary, the invention is intended to cover all modifications, alternative constructions, and equivalents falling within the scope and spirit of the invention. Additionally the figures descriptions are exemplary of one illustrative implementation of the herein described systems and methods and in no way limit the scope of other illustrative implementations of the herein described systems and methods.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A computer implemented method to determine characteristics of sets of organized items comprising:
    identifying, by a computer, a first set of organized items as a compare-from location;
    identifying, by the computer, a second set of organized items as a compare-to location;
    determining, by the computer, a first recursive intrinsic reference representing the first set of organized items;
    determining, by the computer, a second recursive intrinsic reference representing the second set of organized items, wherein each of the first and second recursive intrinsic references is an intrinsic reference to an item containing another intrinsic reference, wherein each of the first and second recursive intrinsic references is a reference to a node in a corresponding hash directed-acyclic graph (HDAG), and wherein the HDAG is an acyclic graph in which higher-level nodes include references to lower-level nodes that are based on hashes of content within said respective lower-level nodes; and
    determining, by the computer, a discrepancy between the first set of organized items and the second set of organized items using the first and second recursive intrinsic references, wherein determining the discrepancy comprises using one or more algorithms to process pairs of HDAGs.

2. The method of claim 1 further comprising generating a first HDAG of intrinsic references, including recursive intrinsic references, that represents the first set of organized items, and generating a second HDAG of intrinsic references, including recursive intrinsic references, that represents the second set of organized items, wherein using the one or more algorithms to process pairs of HDAGs comprises using the one or more algorithms to process the first HDAG and the second HDAG.

3. The method as recited in claim 2 wherein each of the first and second recursive intrinsic references is a result of a hash function applied to a node in a corresponding one of the first and second HDAGs.

4. The method as recited in claim 2, further comprising generating a mapping from first node in the first HDAG to a second node in the second HDAG.

5. The method of claim 2 wherein each intrinsic reference is based on content of a referenced item and each recursive intrinsic reference references a target item that includes a target intrinsic reference.

6. The method of claim 5 wherein the discrepancy is determined by searching for nodes in the first HDAG that match nodes in the second HDAG.

7. The method of claim 6 wherein the searching is performed by collecting a first set of nodes in the first HDAG and a second set of nodes in the second HDAG, and performing a selected cross check on the first set of nodes and the second set of nodes.

8. The method as recited in claim 1 wherein the items in each of the first and second sets are organized as directories.

9. The method as recited claim 1 wherein determining the discrepancy comprises identifying an item in the first set that is not also in the second set.

10. The method as recited in claim 1 wherein determining the discrepancy comprises identifying an item in the second set that is not also in the first set.

11. The method as recited in claim 1 wherein determining the discrepancy comprises determining a difference in organization of the items in the first and second sets.

12. The method as recited in claim 1, further comprising computing a metric representing the discrepancy.

13. The method as recited in claim 12 where computing the metric comprises computing a degree to which an organization of the items in the first and second sets is different.

14. The method as recited in claim 12, further comprising obtaining an attribute of a given one of the items, wherein the computing the metric makes use of the attribute.

15. The method as recited in claim 14 wherein the attribute is a size of the given item.

16. The method as recited in claim 1, further comprising creating a visualization of the discrepancy.

17. The method as recited in claim 1 wherein the discrepancy is identified through a selected cross check on all recursive intrinsic references from the compare-to and compare-from locations.

18. The method as recited in claim 1 wherein the discrepancy comprises identification of a file in the "compare-from" location that partially overlaps a file in the "compare-to" location.

19. The method as recited in claim 1, further comprising determining each of the first and second recursive intrinsic references using a chunking algorithm.

20. The method as recited in claim 1 wherein determining the discrepancy comprises determining the discrepancy between digital picture files on a laptop computer and digital picture files on a personal computer.

21. The method as recited in claim 1 wherein determining the discrepancy comprises determining the discrepancy between a back-up of data found on a back-up storage device and data found in a computing environment.

22. The method as recited in claim 21 further comprising recovering the data found on the back-up storage device and not found in the computing environment onto the computing environment.

23. The method of claim 1 wherein each of the first and second recursive intrinsic references is based on content of a particular item containing another intrinsic reference and the another intrinsic reference is based on content of a second item referenced by the another intrinsic reference.

24. The method of claim 23 wherein the first and second recursive intrinsic references comprises a hash of content of the particular item containing the another intrinsic reference and the another intrinsic reference comprises a hash of content of the second item.

25. A computer readable storage medium having computer readable instructions to instruct a computer to perform a method comprising:
    identifying a first set of organized items from a compare-from location;
    identifying a second set of organized items from a compare-to location;
    determining a first recursive intrinsic reference representing the first set of organized items;
    determining a second recursive reference representing the second set of organized items, wherein each of the first and second recursive intrinsic references is a reference to a node in a corresponding hash directed-acyclic graph (HDAG), and wherein the HDAG is an acyclic graph in which higher-level nodes include references to lower-level nodes that are based on hashes of content within respective lower-level nodes; and
    determining discrepancies between the first set of organized items and the second set of organized items using the first and second recursive intrinsic references, wherein determining the discrepancies comprises using one or more algorithms to process pairs of HDAGs.

26. The computer readable storage medium as claimed in claim 25, wherein the instructions upon execution are to further instruct the computer to perform:
    generating a first HDAG of intrinsic references, including recursive intrinsic references, that represents the first set of organized items, and generating a second HDAG of intrinsic references, including recursive intrinsic references, that represents the second set of organized items, wherein using the one or more algorithms to process pairs of HDAGs comprises using the one or more algorithms to process the first HDAG and the second HDAG.

27. A computer implemented method to determine characteristics of sets of organized items comprising:
    identifying, by a computer, a first set of organized items from a compare-from location;
    identifying, by the computer, a second set of organized items from a compare-to location;
    determining, by the computer, a first hash based directed acyclic graphs (HDAG) for the items from the compare-from location and a second HDAG for the items from the compare-to location;
    determining, by the computer, overlap between the items in the compare-from location and the compare-to location using the first HDAG and the second HDAG;
    determining, by the computer, discrepancies in organization between the first set of organized items and the second set of organized items using the first HDAG and the second HDAG; and
    visualizing results of the overlap and discrepancy determinations in a graphical representation,
    wherein each of the first HDAG and the second HDAG is an acyclic graph in which higher-level nodes include references to lower-level nodes that are based on hashes of content within said respective lower-level nodes.

28. The method of claim 27 wherein the discrepancies are determined by searching for nodes in the first HDAG that match nodes in the second HDAG, and wherein the searching is performed by collecting a first set of nodes in the first HDAG and a second set of nodes in the second HDAG and performing a selected cross check on the first set of nodes and the second set of nodes.

29. A computer readable storage medium storing instructions, executable by a computer system to identify characteristics of sets of organized items, comprising:
    receiving a first set of organized items and a second set of organized items as input;
    generating a first hash based directed acyclic graph (HDAG) for the first set and a second HDAG for the second set;

generating a mapping between nodes of the first HDAG and the second HDAG;
computing overlap and discrepancies between the first set of organized items and the second set of organized items based on the mapping between HDAG nodes in the first and second HDAGs;
generating a graphical representation of the computed overlap and discrepancies,
wherein each of the first HDAG and the second HDAG is an acyclic graph in which higher-level nodes include references to lower-level nodes that are based on hashes of content within said respective lower-level nodes; and
computing a first recursive intrinsic reference based on an HDAG node of the first HDAG, and computing a second recursive intrinsic reference based on an HDAG node of the second HDAG, wherein computing the overlap and discrepancies is based on comparing the first and second recursive intrinsic references, wherein each of the first and second recursive intrinsic references is an intrinsic reference to an item containing another intrinsic reference.

30. A computer system comprising:
storage media to store a first set of organized items and a second set of organized items; and
a processor configured to:
  determine a first hash based directed acyclic graph (HDAG) for the first set and a second HDAG for the second set;
  compute overlap and discrepancies between the first set of organized items and the second set of organized items based on the first HDAG and the second HDAG; and
  generate a graphical representation of the computed overlap and discrepancies,
  wherein each of the first HDAG and the second HDAG is an acyclic graph in which higher-level nodes include references to lower-level nodes that are based on hashes of content within said respective lower-level nodes; and
  compute a first recursive intrinsic reference based on an HDAG node of the first HDAG, and compute a second recursive intrinsic reference based on an HDAG node of the second HDAG, wherein computing the overlap and discrepancies is based on comparing the first and second recursive intrinsic references, wherein each of the first and second recursive intrinsic references is an intrinsic reference to an item containing another intrinsic reference.

31. The system of claim 30,
wherein the processor is configured to further generate a mapping between nodes of the first HDAG and the second HDAG.

32. A computer system having a processor and a computer program cooperating with the processor to perform:
identifying a first set of organized items as a compare-from location;
identifying a second set of organized items as a compare-to location;
determining a recursive intrinsic reference representing the first set of organized items;
determining a second recursive intrinsic reference representing the second set of organized items, wherein each of the first and second recursive intrinsic references is an intrinsic reference to an item containing another intrinsic reference, wherein each of the first and second recursive intrinsic references is a reference to a node in a corresponding hash directed-acyclic graph (HDAG), and wherein the HDAG is an acyclic graph in which higher-level nodes include references to lower-level nodes that are based on hashes of content within said respective lower-level nodes; and
determining a discrepancy between the first set of organized items and the second set of organized items using the recursive intrinsic reference.

\* \* \* \* \*

UNITED STATES PATENT AND TRADEMARK OFFICE
CERTIFICATE OF CORRECTION

| | |
|---|---|
| PATENT NO. | : 7,908,254 B2 |
| APPLICATION NO. | : 11/149509 |
| DATED | : March 15, 2011 |
| INVENTOR(S) | : Henri Jacques Suermondt et al. |

It is certified that error appears in the above-identified patent and that said Letters Patent is hereby corrected as shown below:

In column 3, line 48, delete "is are" and insert -- are --, therefor.

In column 12, line 59, in Claim 4, after "from" insert -- a --.

In column 13, line 8, in Claim 9, delete "recited claim" and insert -- recited in claim --, therefor.

Signed and Sealed this
Fifth Day of July, 2011

David J. Kappos
*Director of the United States Patent and Trademark Office*